United States Patent [19]

Smith

[11] Patent Number: 5,435,586

[45] Date of Patent: Jul. 25, 1995

[54] TOW-HIGH AND GOOSENECK ATTACHMENT FOR HAULING VEHICLES

[76] Inventor: Francis V. Smith, P.O. Box 3487, Bozeman, Mont. 59772

[21] Appl. No.: 213,390

[22] Filed: Mar. 14, 1994

Related U.S. Application Data

[63] Continuation of Ser. No. 916,419, Jul. 21, 1992, abandoned.

[51] Int. Cl.⁶ ............................................. B62D 53/06
[52] U.S. Cl. ..................... 280/425.2; 280/438.1; 280/441.2; 414/481
[58] Field of Search ................... 280/400, 423.1, 425.2, 280/417.1, 441.2, 438.1, 407, 407.1, 433, 441.1, 506, 512, 514, 515, 508; 414/481; 213/75 R; 403/322, 321

[56] References Cited

U.S. PATENT DOCUMENTS

| | | | |
|---|---|---|---|
| 2,124,839 | 7/1938 | Weiss | 280/508 |
| 2,676,783 | 4/1954 | Rogers | 280/441.2 |
| 2,894,764 | 7/1959 | Ronk | 280/425.2 |
| 2,944,834 | 7/1960 | Hill | 280/441.2 |
| 2,953,396 | 9/1960 | Meadows | 280/441.2 |
| 2,967,720 | 1/1961 | Smith | 280/441.2 |
| 2,968,412 | 1/1961 | Hill | 280/441.2 |
| 3,256,042 | 6/1966 | Hunsaker | 280/438.1 |
| 3,698,582 | 10/1972 | Weinmann | 414/481 |
| 4,400,005 | 8/1983 | Losh | 414/481 |
| 4,423,885 | 1/1984 | Camey | 280/441.2 |
| 4,513,987 | 4/1985 | Whitaker | 414/481 |
| 4,747,612 | 5/1988 | Kuhn | 280/508 |
| 4,765,638 | 8/1988 | Kulyk | 414/481 |
| 5,040,815 | 8/1991 | Evans | 414/481 |

FOREIGN PATENT DOCUMENTS

| | | | |
|---|---|---|---|
| 0620378 | 3/1949 | United Kingdom | 280/425.2 |
| 0901241 | 7/1962 | United Kingdom | 280/425.2 |
| 1058601 | 2/1967 | United Kingdom | 280/441.2 |
| 2037684 | 7/1980 | United Kingdom | 280/438.1 |
| 2223999 | 4/1990 | United Kingdom | 280/438.1 |

*Primary Examiner*—Anne Marie Boehler
*Attorney, Agent, or Firm*—Lowe, Price, LeBlanc & Becker

[57] ABSTRACT

A gooseneck and tow-hitch attachment includes a gooseneck, a sliding turntable plate assembly, a tow-hitch lifting assembly, a grab hook and a tow-hitch assembly. The sliding plate turntable assembly permits extension or retraction of the gooseneck and swivelable rotation thereof for towing trailers such as low bed trailers. The tow-hitch assembly and tow lifting frame assembly permit using the gooseneck and tow-hitch assembly in a tow truck mode. The tow-hitch assembly also provides a locking function to secure a low bed trailer or like in the gooseneck hitch while providing a lifting force to permit towing thereof. The grab hook functions to properly seat a trailer hitch equipment in the gooseneck and secure the trailer hitch for towing purposes.

19 Claims, 6 Drawing Sheets

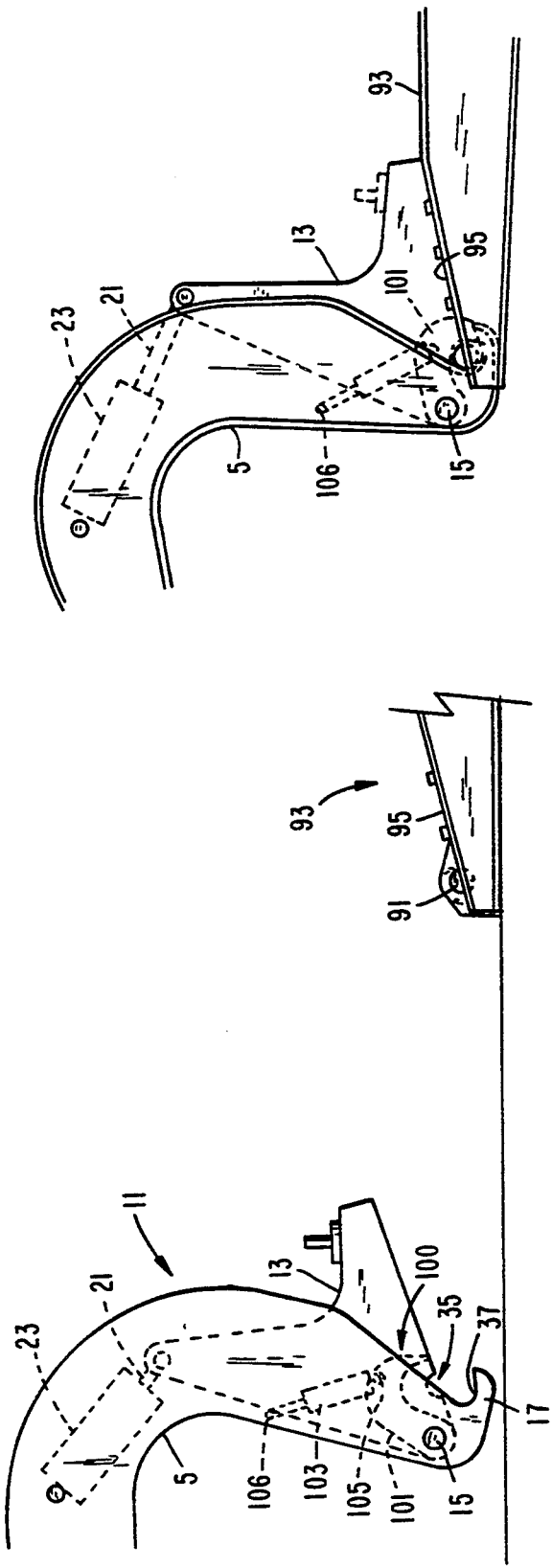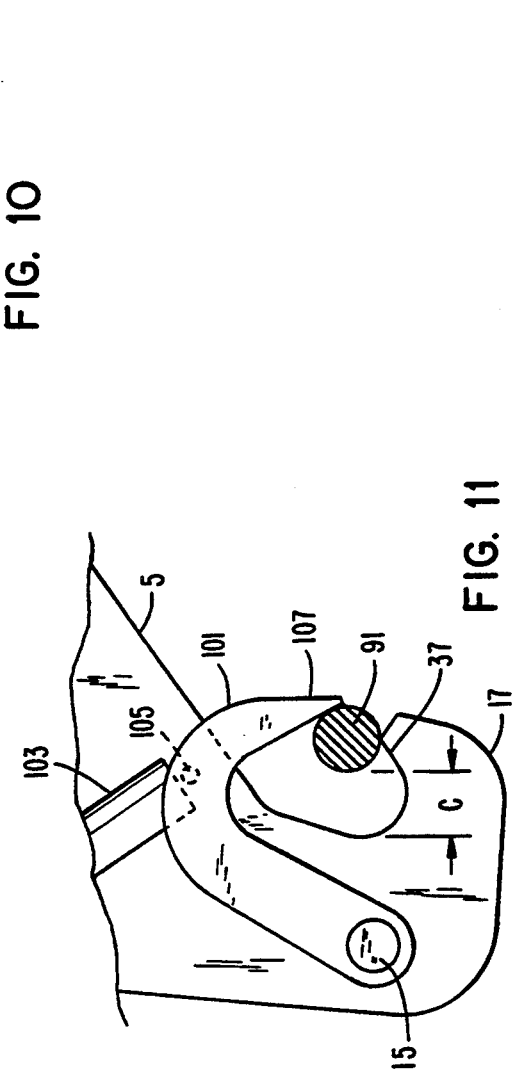

TOW-HIGH AND GOOSENECK ATTACHMENT FOR HAULING VEHICLES

This application is a continuation of Application Ser. No. 07/916,419 filed Jul. 21, 1992, now abandoned.

TECHNICAL FIELD

The present invention relates to a tow-hitch and gooseneck towing attachment for heavy duty hauling vehicles. In particular, the tow-hitch and gooseneck attachment includes the combination of a gooseneck lifting assembly designed to lift and haul vehicles such as low bed trailers and a tow-hitch assembly and a grab hook assembly designed for towing vehicles such as heavy duty hauling trucks. The gooseneck lifting assembly, grab hook assembly and tow-hitch assembly form the gooseneck and tow-hitch attachment with multiple functioning hauling capability.

BACKGROUND ART

In the prior art, various heavy duty vehicles have been proposed for towing purposes. Moreover, various attachments have been proposed for use with these heavy duty vehicles to permit use of a single heavy duty vehicle to perform different towing functions. For example, a heavy duty hauling truck may receive a water tank, spreading apparatus, a towing attachment to haul vehicles or a towing attachment to haul low bed trailers.

One particular device for use with heavy duty hauling vehicles includes a gooseneck for lifting and hauling a trailer. The gooseneck structure is particularly adapted for coupling to low bed trailers clearance between the hitch and a ground surface.

U.S. Pat. No. 4,765,638 to Kulyk discloses a non-ground engaging lifting apparatus for detachable gooseneck trailers which includes a hydraulic system and does not require interaction with the ground on which a trailer is supported.

U.S. Pat. No. 2,894,764 to Ronk discloses a trailer-tractor assembly with a removable gooseneck which is moveable between a forward and a rearward position. The rearward position facilitates attachment to a low bed trailer.

U.S. Pat. No. 4,400,005 to Losh discloses a gooseneck apparatus having a horizontally rearwardly inclined arm for a connection which provides a safe and reliable connecting mechanism whereby coupling between the rear end of a gooseneck and a loaded or unloaded trailer may be easily done by a single operator.

U.S. Pat. No. 4,513,987 to Whitaker discloses a gooseneck-type lifting apparatus which includes a locking feature. The gooseneck includes a hydraulically locking unit to lock the gooseneck attachment to a low bed trailer.

U.S. Pat. Nos. 5,040,815 to Evans and 2,676,783 to Rogers also disclose gooseneck structures for lifting heavy duty trailers.

However, disadvantages associated with these types of gooseneck towing attachments include the inability to perform different towing functions other than for a low bed trailer type vehicle. As such, a need has developed to provide a gooseneck towing apparatus having improved flexibility and function to permit a single towing attachment to provide more than a single type of towing capability.

In response to this need, the present invention provides a gooseneck-tow-hitch attachment for heavy duty hauling vehicles which provides a dual function capability for towing. The inventive gooseneck-tow-hitch attachment permits gooseneck type towing for trailers such as low bed trailers and tow-hitch towing of heavy duty hauling vehicles with a single attachment.

DISCLOSURE OF THE INVENTION

It is accordingly one object of the present invention to provide an improved combination gooseneck and tow-hitch attachment for use with heavy duty hauling vehicles.

It is another object of the present invention to provide a gooseneck and tow-hitch attachment having a dual function capability for tow-hitch hauling of heavy duty vehicles or gooseneck hitching capability for trailers or the like.

It is still another object of the present invention to provide a gooseneck and tow-hitch attachment having improved locking capability when coupling to low bed trailers using the gooseneck towing aspect of the invention.

A further object of the present invention is to provide a gooseneck and tow-hitch attachment which improves weight distribution and stability during towing.

It is a still further object of the present invention to provide a low cost towing attachment for heavy duty vehicles by eliminating the necessity of substituting gooseneck attachments with tow-hitch attachments depending on the particular type of vehicle to be towed.

Another object of the present invention is to provide a grab hook which can both pull a trailer hitch into place and secure the hitch for towing.

Other objects and advantages of the present invention will become apparent as the description thereof proceeds.

In satisfaction of the foregoing objects and advantages, there is provided by the present invention a gooseneck and tow-hitch attachment for use with heavy duty hauling vehicles which includes a gooseneck hitch, a sliding plate and turntable assembly, a tow-hitch assembly and a tow-hitch lifting frame assembly. The gooseneck hitch pivotally and swivelably connects to the sliding plate and turntable assembly. The sliding plate and turntable assembly permits extension of the gooseneck hitch in a first mode for towing low bed trailers or the like. With the gooseneck hitch in a retracted position, the tow-hitch assembly can be used in a tow truck mode.

The tow-hitch assembly has a dual function capability. In a first mode, the tow-hitch assembly includes a hitch for engaging a vehicle to be towed. In an alternative mode, the tow-hitch assembly can be pivoted to clamp a low bed trailer hitch to the gooseneck hitch. Mechanical action of the tow-hitch assembly also elevates the low bed trailer to permit towing thereof.

The tow-hitch lifting plate assembly pivotally connects at one point to the sliding plate and turntable assembly and is rigidly connected to the heavy duty hauling vehicle frame at a second point. In a towing mode, the tow hitch lift assembly can elevate the gooseneck and tow-hitch for the purposes of hauling a vehicle or the like.

A sliding plate and turntable assembly includes hydraulic cylinders connected to a vehicle frame to provide extension or retraction of the gooseneck and tow-hitch assembly. The tow-hitch lifting assembly includes hydraulic cylinders attached to the frame for raising or lowering thereof. The tow-hitch assembly also includes hydraulic cylinders which function to pivot the tow-hitch to facilitate clamping and raising of a trailer when using the gooseneck hitch.

A grab hook assembly includes a generally U-shaped hook which is pivotal between a raised and lowered position. In the raised position, the grab hook permits the gooseneck hitch to connect to a trailer hitch. In a partially lowered position, the grab hook can engage a trailer hitch that is not fully seated in the gooseneck hitch. The grab hook, by the hydraulic cylinder operation which controls pivotal movement thereof, can pull the trailer hitch such that the trailer hitching shaft can fully seat in the gooseneck hitch.

BRIEF DESCRIPTION OF THE DRAWINGS

Reference is now made to the drawings accompanying the invention wherein:

FIGS. 9 and 10 show the gooseneck and tow-hitch attachment as illustrated in FIGS. 7 and 8, respectively, with the grab hook embodiment in the raised and lowered positions, respectively; and FIG. 11 shows a partial view of the gooseneck and grab hook with the tow-hitch removed for clarity.

DESCRIPTION OF THE PREFERRED EMBODIMENT

The present invention relates to a gooseneck and tow-hitch attachment for use with heavy duty hauling vehicles. The invention provides improvements over prior art gooseneck towing attachments by having the capacity to perform dual function towing using a single attachment.

In one mode, the gooseneck and tow-hitch attachment may be positioned on a hauling vehicle for use as a tow truck. The inventive attachment includes a tow-hitch assembly for engaging a vehicle to be towed and a tow-hitch lifting frame assembly to control elevation of the tow-hitch assembly.

In a second mode, the gooseneck and tow-hitch attachment may be used as a low bed gooseneck for hauling trailers such as low bed trailers. In this mode, the gooseneck and tow-hitch attachment is moved to a rearward position to engage the coupling of a low bed trailer. In this mode, the tow-hitch assembly also performs a locking function to secure the coupling of the low bed trailer in the gooseneck hitch.

By combining a gooseneck towing feature and a tow truck towing feature in a single attachment, a hauling truck has the capability to perform dual functioning towing depending on the configuration of the gooseneck and tow-hitch attachment. In this manner, the hauling vehicle does not have to be modified by substituting different types of attachment devices for different towing requirements. Moreover, overall cost is reduced since only a single attachment need be fabricated to perform both towing functions.

The inventive gooseneck and tow-hitch attachment also permits rear positioning of the gooseneck with full clearance of the rear of the truck drive wheels to permit full 90° turns when coupled to a low bed. Further, the geometry and location of hydraulic cylinders in the tow-hitch assembly provides a mechanical advantage to the tow hitch when lifting a low bed off the ground and thus allows the use of smaller diameter and less costly cylinders. The shape of the tow hitch also applies lift and a rigid connection to the front of a low bed while allowing clearance for the installation and usage of the tow hitch for towing.

The gooseneck and tow-hitch attachment includes a slide plate assembly which permits extension and retraction of the gooseneck and tow-hitch. In the retracted position and tow-hitch mode, lift force is transferred to the point of connection in the retracted position which is ahead of the truck drive axle. In this manner, optimum weight distribution is achieved on the towing truck frame, thereby improving stability.

Figure 1:
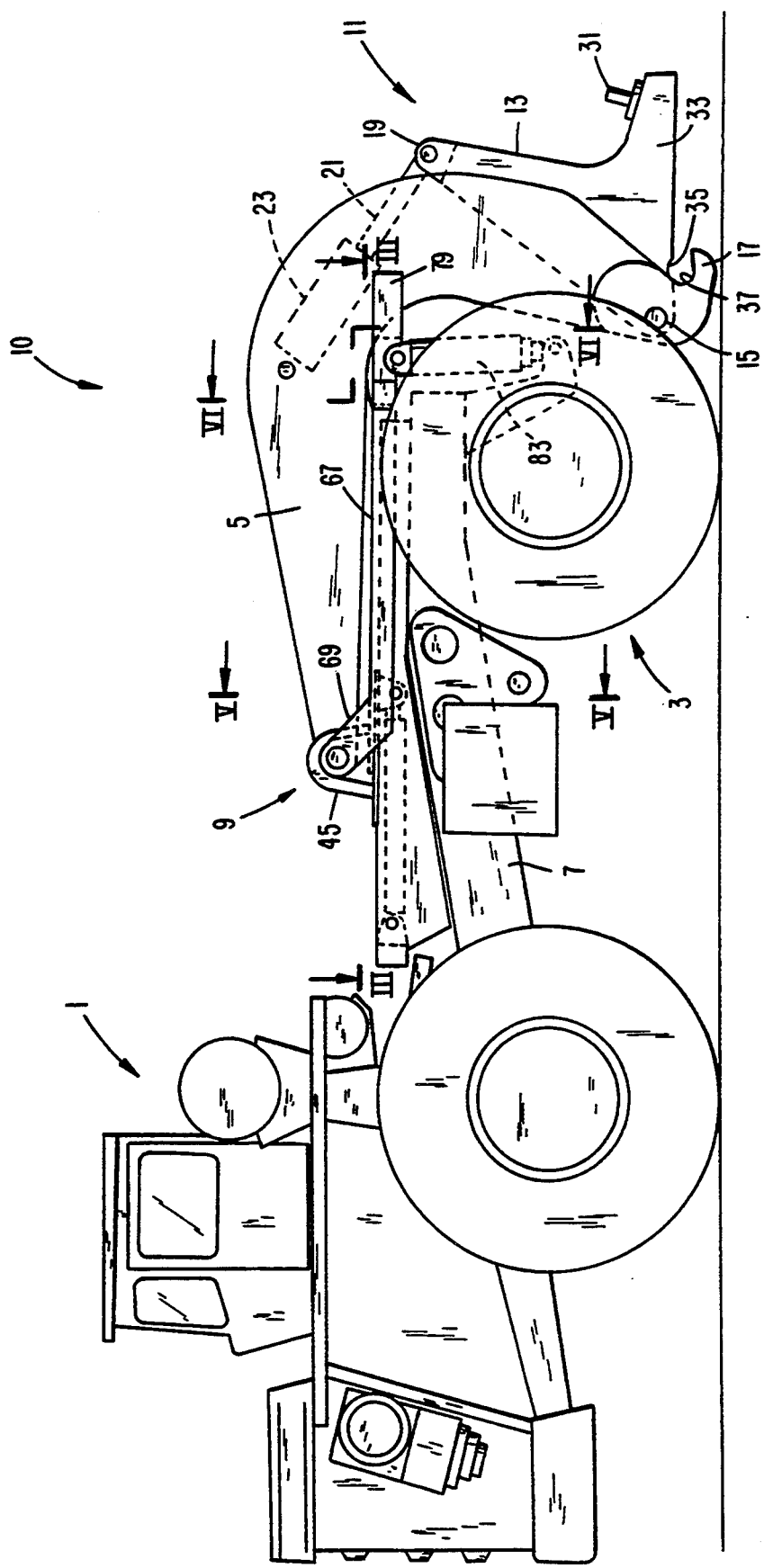
FIG. 1 shows a side view of the gooseneck and tow-hitch attachment attached to a heavy duty hauling vehicle.

With reference now to FIG. 1, the inventive gooseneck and tow-hitch attachment is generally designated by the reference numeral 10 and is shown attached to a heavy duty hauling vehicle 1 having a pair of drive wheels 3.

The gooseneck and tow-hitch attachment 10 includes a pair of goosenecks 5, with only one being shown in FIG. 1. The goosenecks 5 are slidably connected to the hauling vehicle 1 via the sliding turntable assembly 9. As will be described hereinafter, the sliding turntable assembly 9 permits extension and retraction of each of the goosenecks 5 longitudinally with respect to the truck frame 7 and also permits swivelable rotation of the goosenecks about the sliding turntable assembly 9.

The gooseneck and tow-hitch attachment 10 also includes a tow-hitch assembly 11 arranged between inner side surfaces of the goosenecks 5. With particular attention to FIGS. 1 and 2, the tow-hitch assembly 11 includes a hitch member 13 which is pivotally mounted via shaft 15 to each gooseneck hook end 17 of the gooseneck 5. The hitch member 13 is further connected at an upwardly extending end 19 to a pair of hydraulic cylinders 23 via shaft 25 engaging the piston ends 21 of the pistons 27. The opposite end of the cylinders 23 are attached to the goosenecks 5 via the shaft 29.

The hitch member 13 also includes a hitch 31 attached to the extension 33 of the hitch member 13. As will be described hereinafter, the hitch 31 permits engaging a vehicle to be towed when the gooseneck and tow-hitch attachment is configured in the towing mode.

The lower surface of the hitch member 13 has a recess 35 which cooperates with recess 37 in the gooseneck hook end 17 to clamp a member of a trailer or the like for towing. The recesses 35 and 37 are especially adapted for receiving and engaging a coupling shaft of a low bed trailer hitch as will be described hereinafter.

Figure 7:
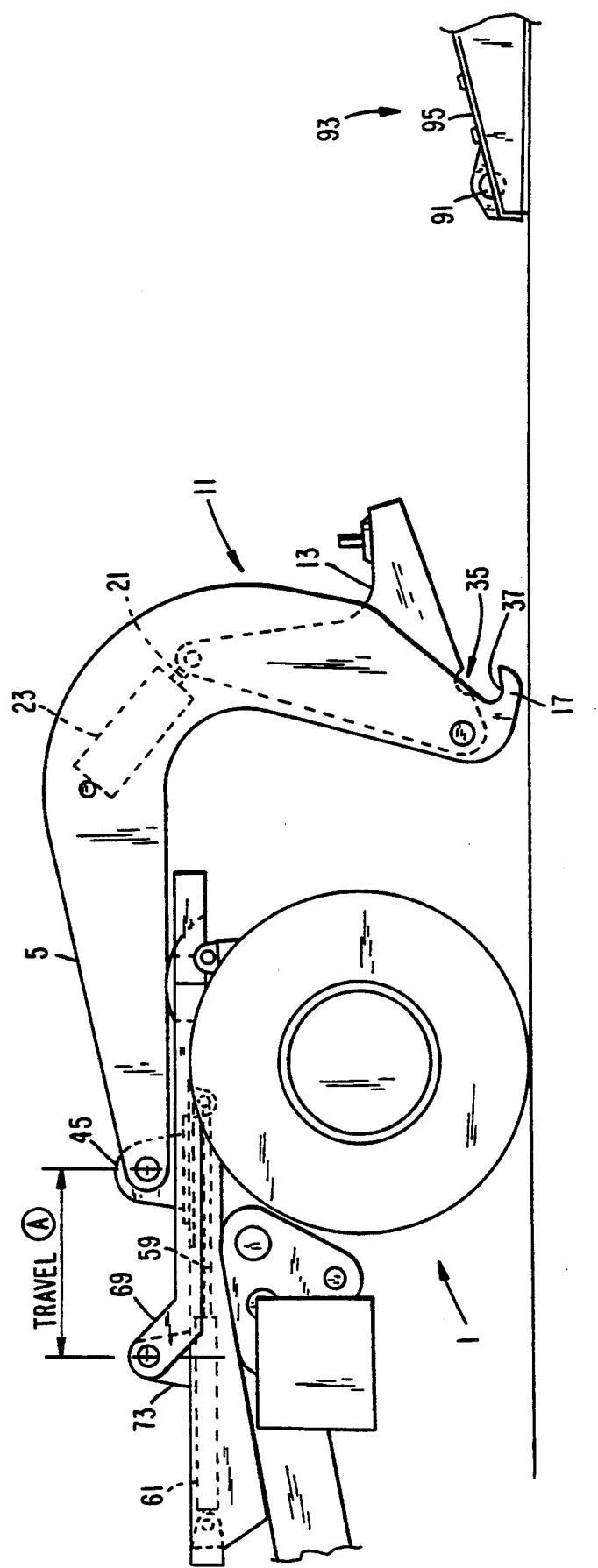
FIG. 7 shows the gooseneck and tow-hitch attachment in a rearward position for use as a low bed gooseneck.

The pistons 21 operate to pivot the hitch member 13 between a lowered position, see FIG. 1 and a raised position, see FIG. 7. As will be described later, retraction followed by extension of the pistons 21 facilitate attachment to a low bed trailer. In the lowered position, the hitch 31 can engage a vehicle for towing purposes.

Figure 3:
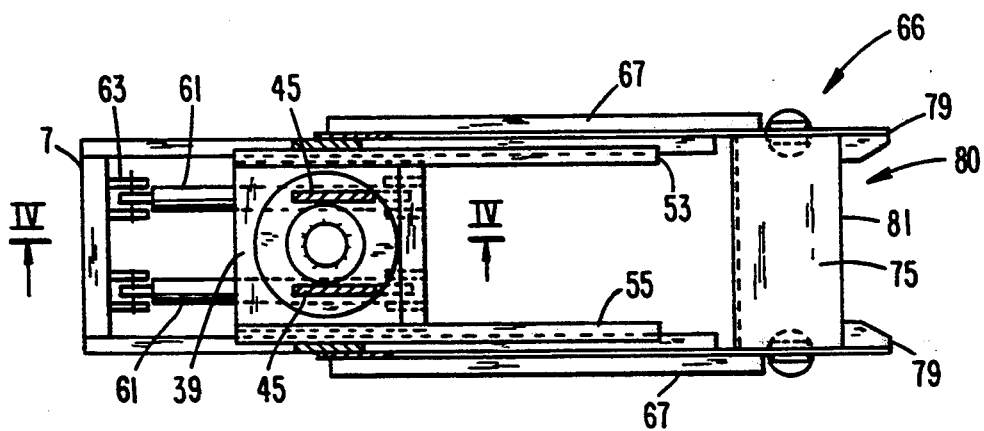
FIG. 3 shows a top view along the line III—III of FIG. 1.
Figure 5:
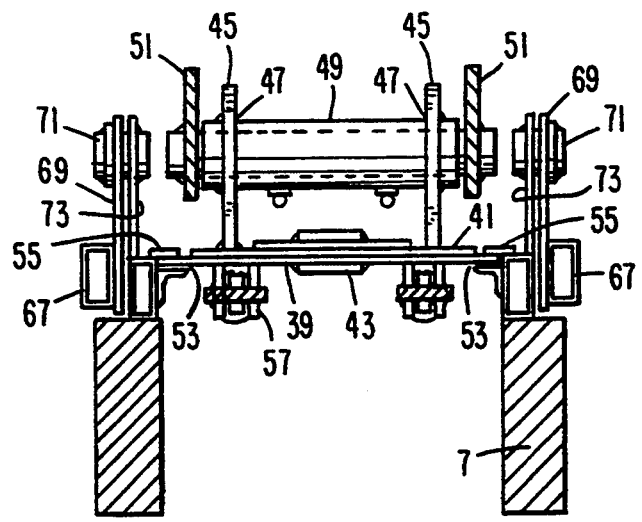
FIG. 5 shows a view along the line V—V shown in FIG. 1.

With reference now to FIGS. 1, 3 and 5, the sliding turntable assembly 9 includes a sliding plate 39 having a turntable plate 41 which rotates with respect to the sliding plate 39 via the pin 43 extending through aligned openings in each of the turntable plate 41 and sliding plate 39. The turntable plate includes a pair of flanges 45 extending upwardly from the top surface of the turntable plate 41. The flanges 45 are spaced apart and include through openings 47 therein which are designed to receive the pivot shaft 49. The pivot shaft 49 is rigidly attached to the gooseneck ends 51 of the goosenecks 5. By pivotally attaching the gooseneck 5 to the turntable assembly 9, the gooseneck and tow-hitch attachment 10 can be moved between a lowered position and a raised position to permit towing a low bed using the gooseneck or a vehicle using the tow hitch. The specific operation of the turntable assembly and sliding plate 39 for towing purposes will be described hereinafter.

Figure 4:
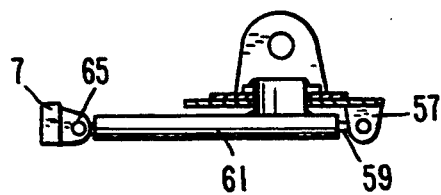
FIG. 4 shows a view along the line IV—IV depicted in FIG. 3.

Still with reference to FIGS. 1, 3 and 5, the sliding plate 39 engages slots 53 in elongated frame member 55 that is rigidly secured to the vehicle frame 7. Attachment of the elongated frame members 55 to the vehicle frame may be done in any known fashion, such as, for example, fasteners or the like. Attached to the underside of the sliding plate 39 and extending outwardly therefrom are flanges 57 which secure the ends of the pistons 59 of the hydraulic cylinders 61. With particular reference to FIG. 4, the piston 61 is secured to the frame 7 via flanges 63 and a connecting pin 65. By extension and retraction of the pistons 59 of the hydraulic cylinders 61, the sliding plate 39 is extended towards the rear of the hauling vehicle 1. Likewise, retraction of the pistons 59 moves the sliding turntable assembly 9 towards the front of the hauling vehicle 1. The specific travel of the sliding turntable assembly 9 will be described in greater detail hereinafter in conjunction with the various modes of operation for the gooseneck and tow-hitch attachment.

With reference now to FIGS. 1, 3, 5 and 6, a lifting frame assembly is generally designated by the reference numeral 66 for use in conjunction with the sliding turntable assembly 9. The lifting frame assembly 66 includes a pair of elongated members 67, each member having a flange end portion 69. Each of the flange end portions 69 are pivotally attached via pivot shaft 71 to a corresponding flange 73 on the elongated members 55. By pivotally attaching the flange end portions 69 of the lifting frame elongated members 67 to the frame members 55, the lifting frame 66 can pivot about the pivot shaft 71 to be raised and/or lowered.

The lifting frame assembly 66 also includes a lifting plate 75 attached to distal ends of the elongated members 67. The lifting plate 75 also includes a pair of guide flanges 79 which form a guide channel 80 with the edge 81 of the lifting plate 75. The guide channel 80 serves to receive the goosenecks 5 in a lowered position.

Figure 6:
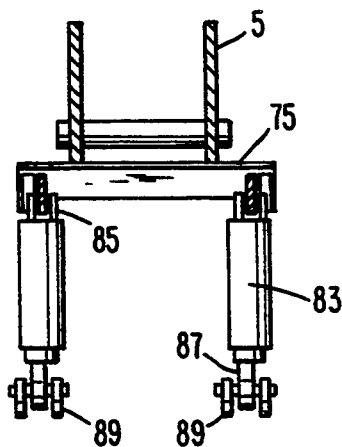
FIG. 6 shows a view taken along VI—VI without the turntable hitch to show greater detail.

With particular reference to FIG. 6, the lifting plate assembly 66 also includes a pair of tow-lift cylinders 83 which are disposed beneath the lifting plate 75 to permit raising or lowering thereof. The tow-hitch cylinders 83 are connected at reference numerals 85 to the underside of the lift plate 75. On the opposite end of the cylinders 83, cylinder pistons 85 are secured to flanges 89, the flanges 89 being rigidly attached to the frame 7. Thus, extension of the pistons 87 from the hydraulic cylinders 83 acts to raise the lifting plate 75, the goosenecks 5 and the tow-hitch assembly 11. It should be noted that the tow-hitch assembly in FIG. 6 is removed for purposes of clarity.

The functioning of the gooseneck and tow-hitch assembly for towing or hauling will now be described. In a first mode, the gooseneck and tow-hitch assembly can be used in a towing capacity. With reference now to FIG. 1, the hitch 13 is shown in the lowered position to engage a vehicle by the hitch pin 31. In the towing position, the piston 21 is fully extended from the hydraulic cylinder 23 such that the hitch 31 is extended outwardly from the rear of the hauling vehicle 1.

After the hitch 31 is positioned to engage a vehicle for towing, the tow-lift cylinders 83 are actuated to extend the pistons 87 therefrom and raise the lifting frame assembly 66. With particular reference to FIGS. 5 and 6, since the goosenecks 5 rest on the lifting plate 75, the gooseneck structure pivots about shaft 49 and elevated to a raised position for moving the towed vehicle to its predetermined destination. During raising of the lifting plate 75, elongated members 67 and flange end portions 69 pivot about the pivot shaft 71 to elevate along with the gooseneck 5 as a result of the actuation of the tow-hitch cylinders 83.

When a vehicle is to be lowered, the pistons 87 of the tow-lift cylinders retract, thus lowering the lifting plate assembly 66, goosenecks 5 and hitch 31.

With reference to FIG. 7, the gooseneck 5 is shown in the extended position as a result of travel of the sliding plate assembly 9. The piston 59 of the cylinder 61 is fully extended to move the sliding plate 39, turntable plate 41 and related components toward the rear of the vehicle 1. The hitch member 13 of the tow hitch assembly 11 is raised by retraction of the piston 21 into the hydraulic cylinder 23. By raising the tow-hitch member 13, the recesses 35 and 37 are further spaced apart for receiving the coupling shaft 91 of a low bed trailer 93. After the goosenecks 5 are extended and the tow hitch member 13 raised, the vehicle 1 is moved rearwardly until the hitch 17 of the gooseneck 5 is positioned below the coupling shaft 91.

Figure 8:
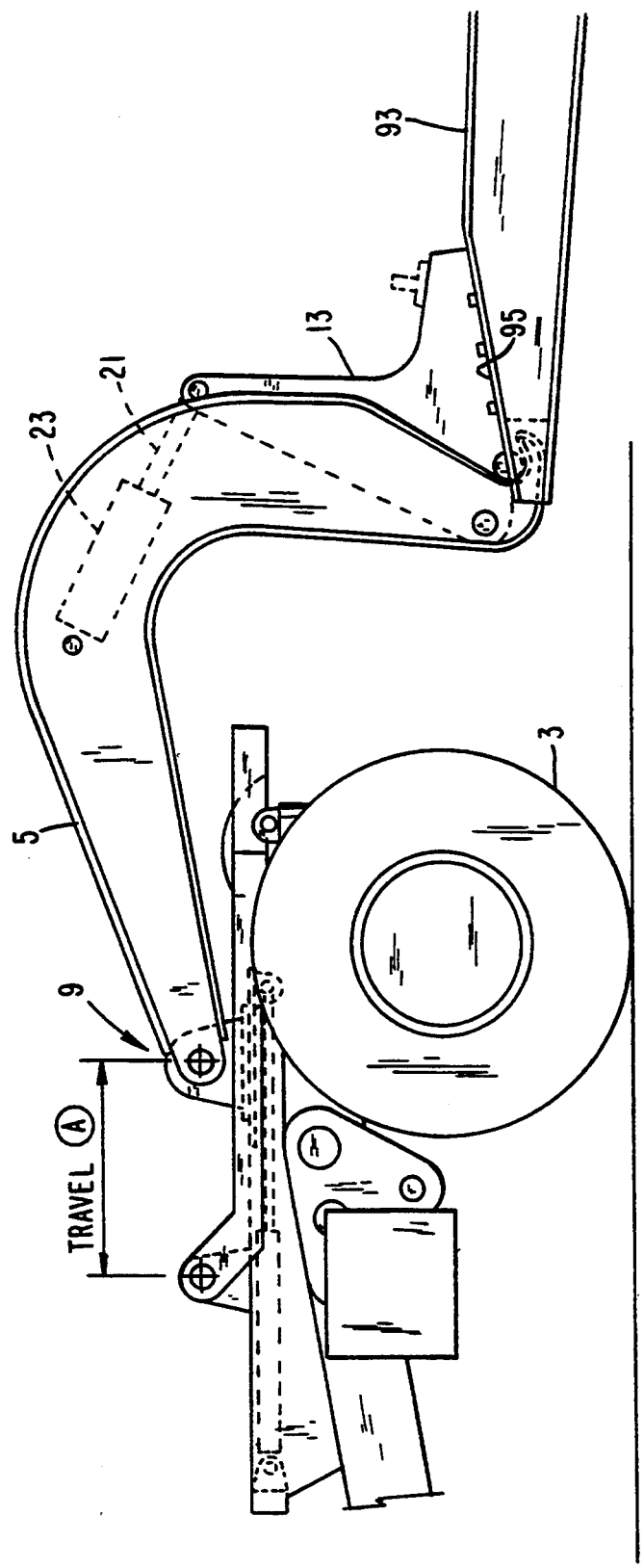
FIG. 8 shows the gooseneck and tow-hitch attachment coupled to a low bed trailer.

With reference now to FIG. 8, once the hitch portion 17 engages the coupling shaft 91, the tow-hitch member 13 is lowered by extension of the piston 21 from the cylinder 23. Lowering the tow-hitch member 13 causes the recess 35 in the lower surface thereof to engage the upper portion of the coupling shaft 91. Engagement of the coupling shaft 91 by recesses 35 and 37 provide a secure locking mechanism to prevent disengagement of the low bed trailer 93 from the gooseneck 5. Further, and since the gooseneck 5 is rigid at the point of attachment to the sliding plate assembly 9, lowering of the tow hitch member 13 onto the surface 95 of the low bed trailer 93 effectively raises the low bed trailer and gooseneck 5 into an elevated and towing position.

By extending the sliding plate assembly 9, the gooseneck 5 is spaced from the rear of the truck drive wheels 3. Moreover, the swivelable attachment of the turntable plate 41 to the sliding plate 39, see FIG. 5, permits the flanges 45, to the shaft 49 and goosenecks 5 to swivel during towing of the low bed trailer 93. The combination of the swivelable attachment of the gooseneck 5 to the truck frame 7 and the space clearance between the drive wheels 3 and the gooseneck 5 permit full 90° turns of the low bed trailer when coupled to a hauling vehicle.

Although not shown, it should be understood that the hydraulic cylinders are controlled by hydraulic pressure supplied by the hauling vehicle 1. Since the manner of connecting the various disclosed hydraulic cylinders to a source of hydraulic pressure and controls therefore are well known in the art, further detail concerning the source of hydraulic pressure, connections and controls is not included.

Figure 2:
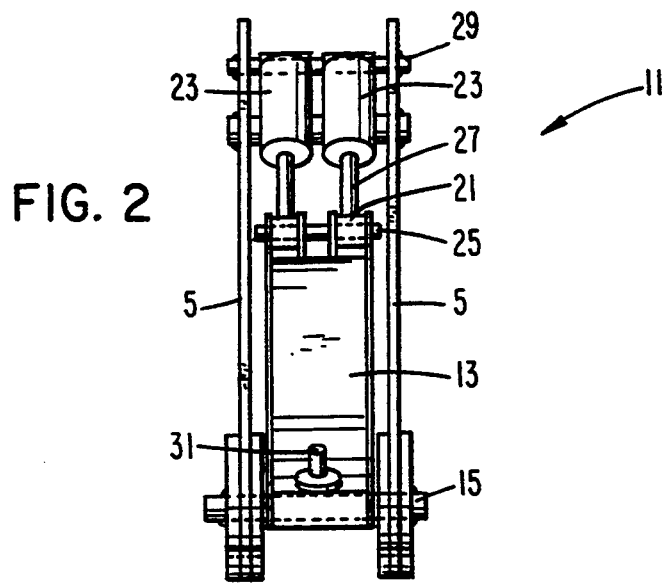
FIG. 2 shows a rear view of the tow-hitch assembly removed to show greater detail.

FIGS. 9 and 10 show the gooseneck and tow-hitch arrangement as depicted in FIGS. 7 and 8, respectively, with the grab hook embodiment of the present invention. In FIG. 9, the grab hook is generally designated by the reference numeral 100 and is seen to include a grab hook 101 which is pivotally mounted on shaft 15. It should be understood that the grab hook 100 is positioned within the hitch member 13. The hitch member 13 comprises a cross member as shown in FIG. 2 with a pair of side members, each side member extending from the cross member in parallel fashion. Thus, the side members create a chamber for disposition of the grab hook 100.

The grab hook 100 is designed to pivot on the shaft 15 by extension and retraction of the hydraulic cylinder 103. The hydraulic cylinder 103 is fixably connected to the hook 101 at the reference numeral 105. The opposite end of the hydraulic cylinder 103 is connected between the goosenecks 5 at reference numeral 106. In FIG. 9, the hydraulic cylinder 103 is in the retracted position such that the hook 101 is in the raised position such that the gooseneck 17 can engage the trailer 93.

Alternatively, the hydraulic cylinder 103 may be fixed to the tow-hitch assembly 11. In this embodiment, motion of the tow-hitch assembly 11 requires a corresponding adjustment in the hydraulic cylinder 103. For example, when the hydraulic cylinder is attached to the tow-hitch assembly, a relief valve in the cylinder allows oil to escape during raising of the trailer. When the hydraulic cylinder is attached to the gooseneck, oil is added during raising of the trailer.

With reference to FIG. 10, the hook 101 is shown in the lowered position such that the shaft 91 of the trailer 93 is firmly secured in the gooseneck hitch portion 17.

It should be understood that the grab hook 100 can be used in combination with the tow-hitch member 13 or, alternatively, in substitution therefor. When the tow-hitch assembly 11 is not provided, the grab hook 100 provides the locking function during towing using the goosenecks 5.

With reference now to FIG. 11, a second function of the grab hook will now be described. In FIG. 11, the grab hook is shown in a partially lowered position. In this configuration, the distal end of the grab hook 107 is lowered sufficiently to engage at least a portion of the trailer shaft 91. The trailer shaft 91 is spaced from the recess 37 in the gooseneck hitch 17 by the distance designated by the letter C. Further lowering of the grab hook 101 by the hydraulic cylinder 103 forces the trailer shaft 91 further into the recess 37 until the position shown in FIG. 10 is achieved. In this manner, the grab hook functions not only to lock the shaft 91 in place when fully seated in the recess 37 but also pulls the trailer 93 toward the gooseneck 5 such that the shaft 91 seats into the recess 37 of the gooseneck hitch 17.

As shown in FIG. 11, the grab hook can translate the shaft 91 a distance C into the recess 37. In a preferred embodiment, the distance C may approximate 4 inches. The grab hook is especially adapted if the trailer shaft 91 is not completely aligned with the hitch recess 37. The grab hook can seat the shaft 91 and further secure the shaft 91 in the recess 37 to prevent disengagement thereof.

It should also be understood that the gooseneck and tow-hitch attachment is easily attached to a hauling vehicle frame. As described above, the gooseneck and tow-hitch attachment is secured to the frame via the connection of the elongated member 55 to the frame, the hydraulic cylinders 61 to the frame, and the pistons 87 of the hydraulic cylinders 83 of the lifting frame assembly. In this manner, the gooseneck and tow-hitch attachment may be easily attached to different types of hauling vehicles. It should be understood that depending on the particular type of hauling vehicle, modifications may be required for securing the various hydraulic cylinders and elongated member to the particular truck frame configuration. However, one skilled in the art given the manner of attaching the inventive gooseneck and tow-hitch attachment to the depicted hauling vehicle would be readily aware of any additional modifications to secure attachment of the inventive device to a hauling vehicle.

As such, an invention has been disclosed in terms of preferred embodiments thereof which will fill each and every one of the objects of the present invention as set forth hereinabove and provides a new and improved gooseneck and tow-hitch attachment for heavy duty hauling vehicles.

Of course, various changes, modifications and alterations from the teachings of the present invention may be contemplated by those skilled in the art without departing from the intended spirit and scope thereof. Accordingly, it is intended that the present invention only be limited by the terms of the appended claims.

I claim:

1. A gooseneck and tow-hitch attachment for use with a heavy duty hauling vehicle comprising:
    a gooseneck member having a gooseneck hitch on an end thereof, said gooseneck hitch having a concave-shaped hitching surface;
    a tow-hitch assembly comprising a tow-hitch member having a tow-hitch pin on an end thereof;
    means for raising or lowering said tow-hitch member, said tow-hitch assembly connected and supported by said gooseneck member;
    means mountable on a frame of said vehicle for swivelably rotating and longitudinally translating said gooseneck member;
    means mountable on a frame of said vehicle for lifting said gooseneck member;
    wherein said means for swivelably rotating and longitudinally translating are adapted to longitudinally translate said gooseneck member and tow-hitch assembly between an extended position for hauling a low bed trailer and a retracted position for towing a vehicle, said means for lifting said gooseneck member being adapted to lift a low bed trailer and clamp a coupling hitch of said low bed trailer to said gooseneck hitch and said means for lifting being adapted to raise said gooseneck member and tow-hitch assembly when said gooseneck member is in said retracted position for towing.

2. The gooseneck and tow-hitch attachment of claim 1, wherein said tow-hitch member is pivotally connected to said gooseneck member and said means for raising or lowering said tow hitch member comprises a hydraulically operated cylinder mounted on said gooseneck member and operably connected to said tow-hitch member for pivoting said tow-hitch member between a raised and lowered position.

3. The gooseneck and tow-hitch attachment of claim 2, wherein said tow hitch member has a recessed portion along a lower surface thereof, said recessed portion being adapted to engage said coupling hitch of said low bed trailer when said coupling hitch is engaged in said gooseneck hitch.

4. The gooseneck and tow-hitch attachment of claim 1, wherein said means for swivelably rotating and longitudinally translating said gooseneck member further comprises
   i) a pair of slotted elongated members mountable along a frame of said vehicle;
   ii) a sliding plate for engaging slots in said elongated members;
   iii) means mountable to said frame for longitudinally translating said sliding plate within said slots; and
   iv) means for pivotally mounting said gooseneck member on said sliding plate to permit raising or lowering of said gooseneck and tow-hitch assembly.

5. The gooseneck and tow-hitch attachment of claim 4, wherein said means for longitudinally translating said sliding plate further comprises at lease one hydraulic cylinder operably connected to said sliding plate and mountable on said frame.

6. The gooseneck and tow-hitch attachment of claim 1, wherein said means for swivelably rotating and longitudinally translating comprises a turntable plate rotatably mounted on a sliding plate, and including means for pivotally mounting said gooseneck member being mounted on said turntable plate.

7. The gooseneck and tow-hitch attachment of claim 6, wherein said means for pivotally mounting comprises a pair of flanges extending upwardly from said turntable plate and having aligned openings therethrough, and a pivot shaft extending through said aligned openings, said pivot shaft further extending through openings in said gooseneck member such that said gooseneck member can pivotally -rotate about an axis of said pivot shaft.

8. The gooseneck and tow-hitch attachment of claim 1, wherein said means for lifting said gooseneck member comprises
   i) a lifting plate;
   ii) means mountable to a frame of said vehicle for raising or lowering said lifting plate;
   iii) a pair of elongated members pivotally mounted at first ends to said means for swivelably rotating and longitudinally translating and connected at second ends to said lifting plate;
   iv) wherein said lifting plate engages said gooseneck member to raise or lower said gooseneck and said tow-hitch assembly.

9. The gooseneck and tow-hitch attachment of claim 8, wherein said means for raising or lowering said lifting plate further comprises at least one hydraulic cylinder operated between said frame and said lifting plate.

10. The gooseneck and tow-hitch attachment of claim 9, wherein said lifting plate includes an opposing pair of guide flanges, said guide flanges and lifting plate forming a channel for guiding said gooseneck during raising or lowering thereof.

11. The gooseneck and tow-hitch attachment of claim 10, wherein said tow-hitch member is pivotally connected to said gooseneck member and said means for raising or lowering said tow hitch member comprises a hydraulically operated cylinder mounted on said gooseneck member and operably connected to said tow-hitch member for pivoting said tow-hitch member between a raised and lowered position.

12. The gooseneck and tow-hitch attachment of claim 11, wherein said tow hitch member has a recessed portion along a lower surface thereof, said recessed portion being adapted to engage said coupling hitch of said low bed trailer when said coupling hitch is engaged in said gooseneck hitch.

13. The gooseneck and tow-hitch attachment of claim 12, wherein said means for swivelably rotating and longitudinally translating said gooseneck member further comprises
   i) a pair of slotted elongated members mountable along a frame of said vehicle;
   ii) a sliding plate for engaging slots in said elongated members;
   iii) means mountable to said frame for longitudinally translating said sliding plate within said slots; and
   iv) means for pivotally mounting said gooseneck member on said sliding plate to permit raising or lowering of said gooseneck and tow-hitch assembly.

14. The gooseneck and tow-hitch attachment of claim 13, wherein said means for longitudinally translating said sliding plate further comprises at lease one hydraulic cylinder operably connected to said sliding plate and mountable on said frame.

15. The gooseneck and tow-hitch attachment of claim 14, wherein said means for swivelably rotating and longitudinally translating comprises a turntable plate rotatably mounted on said sliding plate, said means for pivotally mounting said gooseneck member being mounted on said turntable plate.

16. The gooseneck and tow-hitch attachment of claim 15, wherein said means for pivotally mounting comprises a pair of flanges extending upwardly from said turntable plate and having aligned openings therethrough, and a pivot shaft extending through said aligned openings, said pivot shaft further extending through openings in said gooseneck member such that said gooseneck member can pivotally rotate about an axis of said pivot shaft.

17. The gooseneck and tow-hitch attachment of claim 1 further comprising a grab hook assembly, said grab hook assembly mounted on said gooseneck member and comprising a U-shaped hook having a concave-shaped grabbing surface, said U-shaped hook pivotally mounted to said gooseneck member for movement between a lowered and a raised position such that said concave-shaped hitching surface and said concave-shaped grabbing surface are generally in an opposing relationship, wherein said U-shaped hook is pivotally mounted such that said concave-shaped grabbing surface of said U-shaped hook can engage a trailer hitch component to translate, seat and lock said component in said gooseneck hitch.

18. The apparatus of claim 17 wherein said U-shaped hook is raised or lowered using a hydraulically operated cylinder.

19. A grab hook and gooseneck assembly for use with a heavy duty hauling vehicle comprising:
   a) a gooseneck member having a gooseneck hitch fixed to said gooseneck member on an end thereof, said gooseneck hitch having a concave-shaped hitching surface;

b) a grab hook assembly, said grab hook assembly comprising a U-shaped hook having a concave-shaped grabbing surface, said U-shaped hook pivotally mounted to said gooseneck member for movement between a lowered and a raised position such that said concave-shaped hitching surface and said concave-shaped grabbing surface are generally in an opposing relationship, wherein said concave-shaped grabbing surface of said U-shaped hook is sized in length and concavity such that said concave-shaped grabbing surface at a distal end of said U-shaped hook can engage a trailer hitch component to be seated in said gooseneck hitch, said length and concavity causing said trailer hitch component to travel from said distal end, along said concave-shaped grabbing surface and toward a proximal end of said U-shaped hook during pivotal movement of said U-shaped hook; to seat and lock said component in said gooseneck hitch c) a hydraulically-operated cylinder mounted to said gooseneck member for raising or lowering said U-shaped hook;

d) wherein said U-shaped hook is pivotably mounted to said gooseneck member adjacent said concave-shaped hitching surface so that said distal end of said U-shaped hook overlaps said gooseneck hitch and concave-shaped hitching surface in said lowered position for said seating and locking of said component.

* * * * *